United States Patent
Berna Fornies et al.

(10) Patent No.: US 9,094,370 B2
(45) Date of Patent: *Jul. 28, 2015

(54) REMOTE ACCESS TO INFORMATION ON A MOBILE TERMINAL FROM A WEB BROWSER EXTENSION

(75) Inventors: Hector Berna Fornies, Madrid (ES); Guillermo Caudevilla Laliena, Madrid (ES)

(73) Assignees: VODAFONE GROUP PLC, New Bury, Berkshire (GB); VODAFONE ESPANA, S.A., Alcobendas, Madrid (ES)

( * ) Notice: Subject to any disclaimer, the term of this patent is extended or adjusted under 35 U.S.C. 154(b) by 1056 days.

This patent is subject to a terminal disclaimer.

(21) Appl. No.: 12/599,493
(22) PCT Filed: May 7, 2008
(86) PCT No.: PCT/ES2008/000321
§ 371 (c)(1),
(2), (4) Date: Sep. 13, 2010
(87) PCT Pub. No.: WO2008/135621
PCT Pub. Date: Nov. 13, 2008

(65) Prior Publication Data
US 2010/0330976 A1 Dec. 30, 2010

(30) Foreign Application Priority Data
May 7, 2007 (ES) .................................. 200701212

(51) Int. Cl.
*H04W 4/00* (2009.01)
*H04L 29/08* (2006.01)
(52) U.S. Cl.
CPC ............ *H04L 67/025* (2013.01); *H04L 67/125* (2013.01)
(58) Field of Classification Search
CPC ......... H04W 4/00; H04L 67/26; H04L 67/02; H04L 67/04
USPC ............ 455/418–420, 414.1–414.4; 709/203, 709/224, 227, 228
See application file for complete search history.

(56) References Cited

U.S. PATENT DOCUMENTS 6,968,535 B2    11/2005  Stelting et al.
(Continued)

FOREIGN PATENT DOCUMENTS

EP    0 973 350    1/2000
EP    1 542 432    6/2005
(Continued)

OTHER PUBLICATIONS

Wikman et al. Providing http Access to Web Servers Running on Mobile Phones. NCR-TR-2006-005. May 24, 2006 [recuperado de internet el Sep. 29, 2008] <URL:http://research.nokia.com/tr/NRC-TR-2006-005.pdf. Todo el documento.
(Continued)

*Primary Examiner* — Khawar Iqbal
(74) *Attorney, Agent, or Firm* — Workman Nydegger (57) ABSTRACT

The invention relates to a method and system for managing information stored and/or services configured in a mobile terminal from a remote terminal, wherein the mobile terminal is configured to connect to a mobile communications network and comprises a web server having an API defined for each piece of information and for each service provided by the mobile terminal, and wherein said remote terminal has access to a data network. It comprises: making, from an extension of a web browser of the remote terminal to the mobile terminal, an HTTP request for managing one piece of information stored or a service configured in the mobile terminal, wherein the HTTP request is in accordance with said API defined in the web server of the mobile terminal and comprises an identifier of said information or service which is to be managed; sending an HTTP response from the mobile terminal to the extension in accordance with said API defined in the web server of the mobile and showing in the remote terminal an interface comprised in said extension for managing said information stored or service configured in the mobile.

20 Claims, 7 Drawing Sheets (56) References Cited

U.S. PATENT DOCUMENTS

| | | | |
|---|---|---|---|
| 7,979,062 B2* | 7/2011 | Cotevino et al. ............. 455/418 |
| 8,060,075 B2* | 11/2011 | King ........................... 455/420 |
| 2001/0046851 A1 | 11/2001 | Yamaguchi |
| 2003/0076792 A1 | 4/2003 | Theimer |
| 2003/0182461 A1 | 9/2003 | Stelting et al. |
| 2005/0004968 A1 | 1/2005 | Mononen et al. |
| 2005/0149564 A1* | 7/2005 | Jain et al. ................... 707/104.1 |
| 2006/0031943 A1* | 2/2006 | Schultz ........................... 726/29 |
| 2006/0200541 A1 | 9/2006 | Wikman et al. |
| 2006/0248168 A1* | 11/2006 | Nishimura et al. ........... 709/219 |
| 2006/0274726 A1 | 12/2006 | Wikman et al. |
| 2007/0067385 A1* | 3/2007 | D'Angelo et al. ............ 709/203 |
| 2007/0174490 A1* | 7/2007 | Choi et al. ................... 709/246 |
| 2007/0214429 A1 | 9/2007 | Lyudovyk et al. |
| 2007/0247660 A1* | 10/2007 | Nuggehalli ................. 358/1.15 |
| 2008/0003996 A1* | 1/2008 | Strandell et al. ............. 455/420 |
| 2009/0106366 A1 | 4/2009 | Virtanen et al. |
| 2009/0124272 A1* | 5/2009 | White et al. ................. 455/466 |
| 2010/0269108 A1* | 10/2010 | Boudreau et al. ............ 717/178 |
| 2011/0319095 A1* | 12/2011 | Burroughs et al. ........ 455/456.1 |
| 2012/0042006 A1* | 2/2012 | Kiley et al. .................. 709/203 |
| 2012/0094635 A1* | 4/2012 | Ananthanarayanan et al. ............................ 455/411 |
| 2012/0149369 A1* | 6/2012 | Lamba et al. ................ 455/433 |
| 2015/0026022 A1* | 1/2015 | Choi et al. ..................... 705/34 |

FOREIGN PATENT DOCUMENTS

| | | |
|---|---|---|
| EP | 1720366 A2 | 11/2006 |
| GB | 2423895 | 9/2006 |
| KR | 2003-0056746 | 7/2003 |
| KR | 2004-0023426 | 3/2004 |
| KR | 2005-0019164 | 3/2005 |
| WO | WO 2006067262 | 6/2006 |

OTHER PUBLICATIONS

Wikman et al. Personal Website on a Mobile Phone. NCR-TR-2006-004. May 24, 2006 [recuperado de internet el Jan. 21, 2008] <URL:http://research.nokia.com/tr/NRC-TR-2006-004.pdf. Todo el documento.

Wikman et al. Mobile Personal Website. Sep. 25, 2006. [recuperado de internet el Sep. 29, 2008] <URL:http://www.sigmobile.org/mobisys/2006/demos/Wikman.pdf. <URL:http://web.archive.org/web/*/ht/www.sigmobile.org/mobisys/2006/demos/Wikman.pdf>. Todo el documento.

U.S. Appl. No. 12/599,490, filed Oct. 20, 2010, Hector Berna Fornies et al.

U.S. Appl. No. 12/599,490, Sep. 21, 2012, Office Action.
U.S. Appl. No. 12/599,490, Jan. 11, 2013, Final Office Action.
U.S. Appl. No. 12/599,490, May 1, 2013, Office Action.
U.S. Appl. No. 12/599,490, Oct. 23, 2013, Final Office Action.
U.S. Appl. No. 12/599,490, May 15, 2014, Notice of Allowance.
U.S. Appl. No. 12/599,490, Sep. 23, 2014, Notice of Allowance.
U.S. Appl. No. 12/599,490, Oct. 7, 2014, Notice of Allowability.

* cited by examiner

REMOTE ACCESS TO INFORMATION ON A MOBILE TERMINAL FROM A WEB BROWSER EXTENSION

FIELD OF THE INVENTION

The present invention is applied to the field of mobile telecommunications networks, more specifically, to the remote access to the information stored in a mobile telephone.

BACKGROUND OF THE INVENTION

The memory of the mobile telephone and its SIM card currently store personal data of the user and mobile terminal state information. Personal data of the user stored in the memory of the mobile telephone and the SIM card is understood to be contacts, notes, calendar, images, sounds, videos, short messages (SMSs), multimedia messages (MMSs) and electronic mail (emails). The mobile terminal state information comprises, among others, the incoming and outgoing call log, the battery level of the mobile telephone, the coverage level of the mobile terminal and the mobile telephone state (normal, high, silent, vibration only). The mobile telephone offers a variety of services, such as making calls, sending SMSs, MMSs and emails, incoming call diversion and photographing and recording videos with the camera of the mobile telephone. All this information and services are accessed from the mobile telephone itself.

In addition, a mobile terminal is always connected to the circuit domain by means of GSM, UMTS networks or the like. This circuit domain allows it to make and receive calls, send and receive SMSs and USSD (Unstructured Supplementary Service Data) messages. The data or packet domain, also called the internet, is not always accessible in the mobile terminal. The technology for connecting to the packet domain can be of very different types such as GPRS, EDGE, UMTS, WiFi, WiMAX, among others. The connection to the data or packet domain is carried out by the initiative of the user or mobile terminal due to an external event or when the mobile telephone has WiFi or WiMAX coverage. This implies that direct requests cannot be sent to the mobile terminal from the data or packet domain, but rather it is the mobile terminal which makes the requests to the packet domain. Furthermore, once the mobile terminal is connected to the packet domain, the location of the mobile terminal cannot be known for certain by means of its IP or URL address, due to the fact that there is no standardized or commonly accepted system for identifying and consequently locating a mobile telephone in the packet domain.

In addition, web servers are known which are programs responsible for accepting HTTP (Hypertext Transfer Protocol) requests from clients, normally web browsers, and providing them with the HTTP responses together with the data contents, which are usually web pages. Web servers are normally large computers capable of providing multiple HTTP responses.

Security and authentication SSL (Secure Socket Layer) applications such as those described in RFC 2617, entitled HTTP Authentication: Basic and Digest Access Authentication, are also known.

In recent years, Representational State Transfer or REST has also been developed, which is a software architecture technique for distributed hypermedia systems such as the World Wide Web. The term REST is generally used to describe any simple web interface transmitting specific data on HTTP without an additional messaging layer or session tracking.

The personal data of the user stored in the memory of the mobile telephone and its SIM card and the mobile terminal state information can currently only be accessed, added, deleted and shown directly from the mobile telephone using the screen of the mobile telephone, the keys, the scroll wheel, pencils or pointers or even voice commands. The same occurs with services offered by a mobile telephone, which can only be executed from the mobile telephone itself.

As regards web servers, although several mobile telephones have a web server, it is rather unusual that a web server of a mobile telephone is capable of providing HTTP responses, mainly due to the lack of permanent connection to the data or packet domain and due to the difficulty of identifying and locating the mobile terminal in the packet domain. For example, US patent application US2001/0046851 describes a mobile terminal including a web server through which the mobile terminal connects to a remote management terminal. The purpose of the web server in the mobile terminal is to allow the latter to control a device connected thereto.

Several methods and systems for attempting to remotely manage a mobile telephone have been proposed to date. For example, European patent application EP1542432 describes a system in which a web server housed in a data network receives HTTP requests from a mobile telephone in order to update data relating to the mobile telephone which are stored in the web server of the data network.

However, this process for requesting information from the web server requires the presence and intervention of the user of the mobile telephone and the direct handling thereof.

SUMMARY OF THE INVENTION

The object of the present invention is to remotely manage the different functionalities, services and stored information of a mobile terminal without needing to physically handle the same.

To that end the present invention provides an architecture which allows obtaining, adding and deleting personal data stored in the mobile terminal and its SIM card and mobile terminal state information; and executing the mobile terminal services from any device connected to a data or packet network, also called Internet. A user thus has an extension of the mobile terminal installed in his or her web browser of a remote terminal. This extension represents the mobile terminal in a web browser of a remote terminal (both personal computer and portable terminal or computer). This entity adds the functionality of the mobile terminal to the web browser of this remote terminal, which comprises obtaining, adding and deleting personal data stored in the mobile terminal and its SIM card and mobile terminal state information; and executing the mobile terminal services from any device connected to a data or packet network, also called Internet. This extension can be an additional element, such as an additional element in the menu of the browser, an additional search bar of the browser, or an additional button in the tool bar. Through the extension, the user sends commands and obtains, adds and deletes information and orders executing the services by directly accessing a web server housed in the mobile terminal. A user of a mobile telephone or terminal can thus interact with his or her mobile terminal from a remote terminal with more features (for example, a larger screen) instead of having to do it directly on the small screen and minute keys of the mobile telephones.

Thus, one of the aspects of the present invention relates to a method for managing information stored and/or services configured in a mobile terminal from a remote terminal, in which the mobile terminal is configured to connect to a mobile communications network and comprises a web server having an API defined for each piece of information and service provided by the mobile terminal, and in which said remote terminal has access to a data network. The method comprises: making, from a web browser extension of the remote terminal, an HTTP request for managing at least one piece of information stored or one service configured in the mobile terminal. This HTTP request is in accordance with the at least one API defined in the web server of the mobile terminal. The HTTP request further comprises an identifier of that information or service which is to be managed. The method also comprises sending, from the mobile terminal to the extension, an HTTP response in accordance with the API defined in the web server of the mobile terminal and showing in the remote terminal an interface comprised in said extension for managing the corresponding information stored or corresponding service configured in the mobile terminal.

The HTTP request from the extension to the mobile terminal preferably comprises the steps of: making an HTTP request through the data network from the extension to a gateway capable of locating the mobile terminal which is connected to a mobile communications network; and sending the HTTP request to an IP connections manager of the mobile terminal.

The HTTP response from the mobile terminal to the extension preferably comprises the steps of: sending an HTTP response in accordance with the at least one API defined in the web server of the mobile terminal from an IP connections manager of the mobile terminal to a gateway through the mobile communications network; and sending that HTTP response in accordance with said at least one API defined in the web server of the mobile terminal from said gateway to the extension through the data network.

The HTTP request in accordance with the at least one API defined in the web server of the mobile terminal sent to the IP connections manager of the mobile terminal is sent to the web server by means of said HTTP request.

The HTTP request in accordance with said at least one API defined in the web server sent to the web server of the mobile terminal is in turn sent to a manager module which is chosen from: a module for managing personal data of the user, a module for managing the mobile terminal state information and a module for managing the mobile terminal services.

The method optionally further comprises a notification step for notifying the user whereby the user is offered one of the following options: permanently allowing the execution of the API, temporarily allowing said execution, permanently denying the execution of the API or temporarily denying said execution.

The information to be managed preferably relates to a resource which is chosen from one of the following groups of resources: personal data of the user, mobile terminal state information and mobile terminal services. With said resource an action is carried out which is chosen from one of the following groups of actions: actions relating to managing personal data of the user, actions relating to managing the mobile terminal state information and actions relating to managing mobile terminal services.

The identifier of the information or service to be managed comprised in the HTTP request comprises the URL of the information or service to be managed. Said URL preferably comprises the MSISDN of the mobile terminal.

Said information stored in the mobile terminal relates to a piece of information which is preferably chosen from one of the following groups: personal data of the user and mobile terminal state information. With said information an action is carried out which is chosen from one of the following groups of actions: actions relating to managing personal data of the user and actions relating to managing the mobile terminal state information.

The information stored in a mobile terminal is stored in the memory of the mobile terminal or in the SIM card thereof.

Said service configured in the mobile terminal relates to a service from the group of mobile terminal services. With said service an action is carried out which is chosen from the group of actions relating to managing mobile terminal services.

The HTTP request is made on a data channel which is set up in a signaling channel previously set up between the gateway and the IP connections manager of the mobile terminal.

The HTTP response is carried out on a data channel which is set up in a signaling channel previously set up between the gateway and the IP connections manager of the mobile terminal.

The signaling channel between both elements is preferably a TCP socket. The data channel between both elements is also preferably a TCP socket.

Another aspect of the present invention relates to a system comprising: at least one mobile terminal configured to be connected to a mobile communications network, in which the mobile terminal comprises a web server; at least one terminal configured to be connected to a data network, in which said terminal comprises a web browser which in turn comprises an extension. The terminal is capable of remotely managing at least one piece of information stored and/or one service configured in the mobile terminal by means of accessing an interface comprised in the web browser extension of the terminal.

The system preferably further comprises a gateway capable of setting up a connection between the data network and the mobile communications network.

BRIEF DESCRIPTION OF THE DRAWINGS

For the purpose of aiding to better understand the features of the invention according to a preferred practical embodiment thereof and to complement this description, a set of drawings with an illustrative and non-limiting character is attached as an integral part thereof. In these drawings.

DETAILED DESCRIPTION OF THE INVENTION

In the context of the present invention, the following definitions must be taken into account:

An Application Programming Interface or API is a source code interface which a computer system or a program library provides and sets forth so that another computer program can execute service requests. It is the set of calls to a computer system or a program library offering access to its services from the processes and represents a method for achieving abstraction in the programming, generally, although not necessarily, between the lower and upper levels or layers of the software.

REST (Representational State Transfer) API is understood to be an API which is defined based on URLs (Uniform Resource Locators) and is invoked by means of HTTP without any messaging layer such as SOAP or session tracking with HTTP cookies. The Representational State Transfer (REST) is a style of software architecture for distributed hypermedia systems such as the World Wide Web.

Furthermore, in the context of the present invention, the term web browser extension is defined as an additional element in the web browser of a terminal, such as an additional element in the menu of the web browser of the terminal, or an additional search bar of the web browser of the terminal, or an additional button in the tool bar of the web browser of the terminal. Likewise, the term telephone entity is defined as a web browser extension representing a mobile terminal in a web browser of a terminal (this terminal including the telephone entity being considered as a remote terminal to the mobile terminal represented by the telephone entity). This entity adds the functionality of the mobile terminal to the web browser of this remote terminal, which comprises (the functionality) obtaining, adding and deleting personal data stored in the mobile terminal and its SIM card and mobile terminal state information; and executing the mobile terminal services.

Throughout this specification the term "comprises" and its derivatives must not be interpreted in an excluding or limiting sense, i.e., it must not be interpreted in the sense of excluding the possibility that the element or concept which it refers to includes additional steps or elements.

Figure 1:
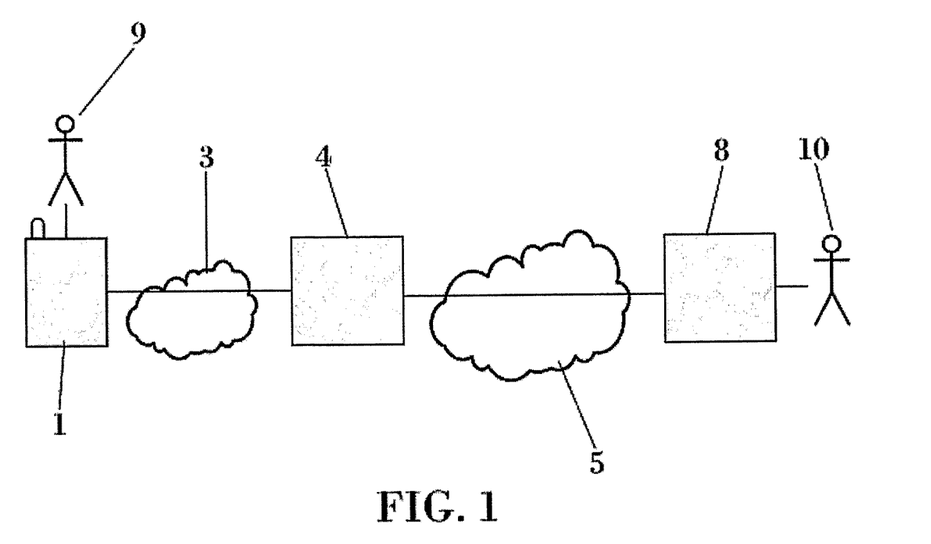
FIG. 1 shows the general architecture of the system according to an embodiment of the present invention.

FIG. 1 shows the general architecture of the system according to an embodiment of the present invention.

The system of the present invention comprises a series of elements which are described below:

As shown in FIG. 1, the system comprises a mobile terminal 1. The mobile terminal 1, which can be a mobile telephone, a PDA or the like, is any mobile terminal 1 capable of connecting to a wireless or mobile data network 3. Non-limiting examples of wireless or mobile networks are GPRS, EDGE, UMTS, HSDPA, HSUPA, WiFi, WiMAX and Bluetooth.

Figure 2:
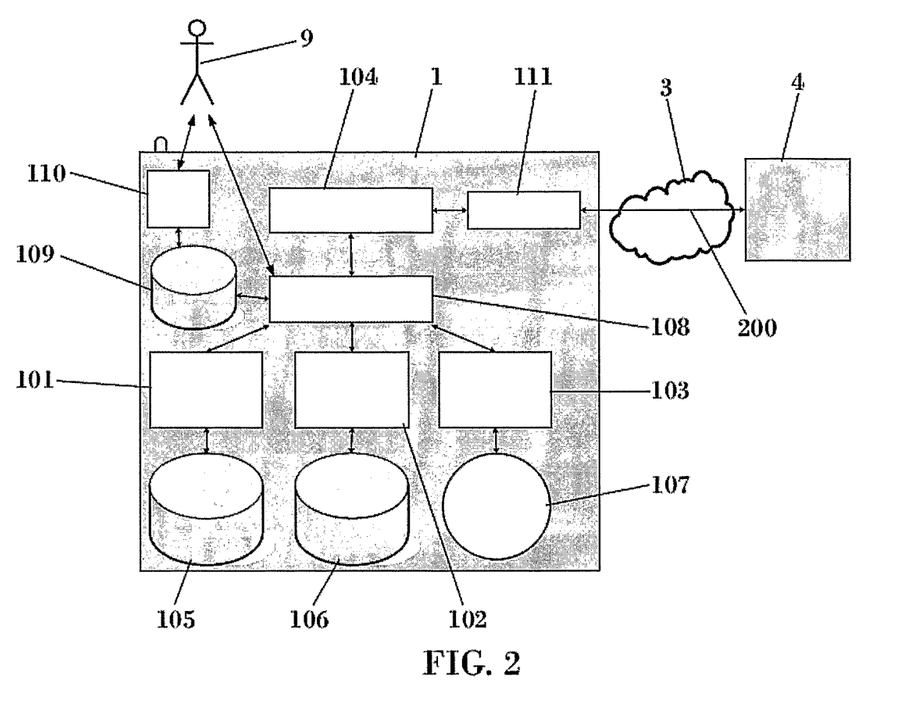
FIG. 2 shows the architecture of the mobile terminal according to an embodiment of the present invention.

The mobile terminal 1 comprises personal data of the user, state information of the mobile terminal itself and services provided by the mobile terminal 1. The personal data of the user and the state information of the mobile terminal itself can be stored both in the memory of the mobile terminal itself and in the SIM card thereof. FIG. 2 shows the architecture of the mobile terminal 1 in greater detail. As can be seen, the mobile terminal 1 also comprises a program or module for managing the personal data of the user 101, which management consists of obtaining, adding and deleting this data. It also comprises a program or module for managing the mobile terminal state information 102, which management consists of obtaining this information and deleting some of it, such as the incoming calls log and outgoing calls log. It also comprises a program or module for managing the mobile terminal services 103, which is in charge of executing such services. The functionality of these three programs or modules 101, 102, 103 is exposed, i.e., it can be accessed for its remote execution, through a web server 104 comprised in the mobile terminal 1. These functionalities are carried out by means of REST APIs. This means that by means of HTTP (HyperText Transfer Protocol) requests to the web server 104 of the mobile terminal 1, the personal data 105 of the user can be obtained, added and deleted, the telephone state information 106 can be obtained and some of it deleted, such as the incoming call log 106-1 and outgoing call log 106-2, and the services of the mobile telephone 107 can also be executed. This is explained in detail below.

The web server 104 can further optionally provide authentication, confidentiality and integrity in the communications for executing the REST APIs. To that end a conventional authentication and security application such as SSL is enabled.

The web server 104 can further optionally have a notification system 108 for notifying the user 9 of the mobile terminal of the execution of the API. This system notifies the user 9 of the mobile terminal 1 who (which user 10 is controlling the remote terminal 8) is to execute which API. The notification 108 is based on displaying a window on the screen of the mobile terminal 1 to the user 9 so that he or she chooses among the following options: always allowing a remote user 10 who is accessing the web server 104 of the mobile terminal 1 from a remote terminal 8 to execute a certain REST API, allowing the accessing remote user 10 to execute said API only once, allowing the accessing remote user 10 to execute said API for a certain amount of time or number of times, denying the execution of an API for the accessing remote user 10 only once or always denying said execution for the accessing remote user 10.

The system preferably uses the identification of the basic HTTP authentication for identifying the remote user 10 who is accessing the REST API in this notification system 108. The information on the remote users who have permissions to access said API always or only once, either for accessing during a certain amount of time, or a certain number of times or indefinitely, or invariably have permission denied, or have it denied only once, is stored in the database 109 of the access lists in the mobile terminal 1.

The mobile terminal 1 also further comprises a lists manager 110 which allows adding, deleting or changing the permissions of the database 109 of the access lists.

Finally, the mobile terminal 1 comprises an IP connections manager 111, capable of maintaining a data connection 200 open with an external server 4 in the wireless or mobile network 3, called a permanent data connections manager 4. This permanent connections manager 4 is a gateway allowing the connection between the wireless or mobile data network 3 and the data network 5 and having the capacity to manage permanent data connections. The gateway 4 is detailed below. The open data connection 200 with the gateway 4 allows the mobile terminal 1 to be available and locatable in the mobile network 3, and therefore the REST APIs indicated with reference to the web server 104 of the mobile terminal 1 can be remotely used.

Figure 3:
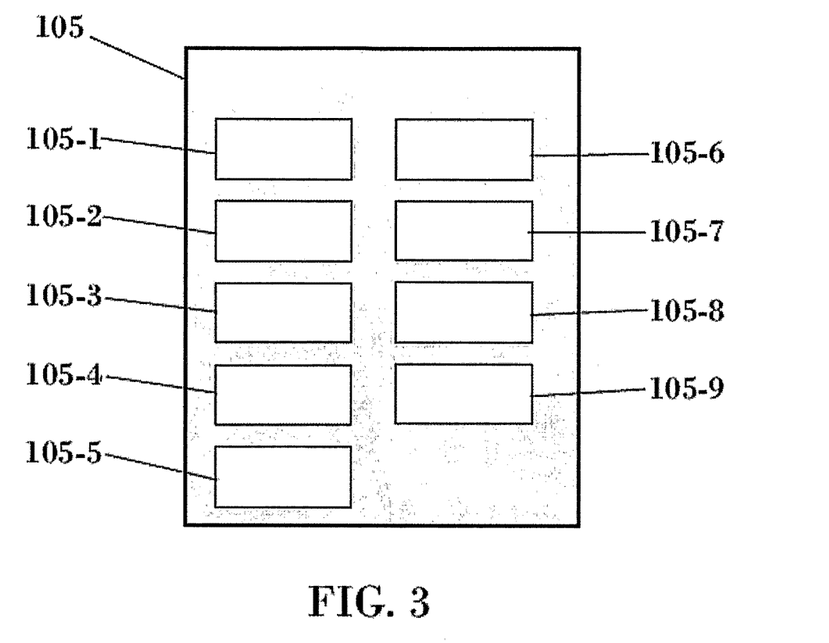
FIG. 3 shows the personal data of the user which can be stored in a mobile telephone or in its SIM card.

The diagram of FIG. 3 shows the personal data 105 of the user 9 which is stored in the mobile terminal 1 and/or in its SIM card. Examples of personal data 15 are, by way of an illustrative and non-limiting example, contacts 105-1, notes 105-2, calendar 105-3, images 105-4, sounds 105-5, videos 105-6, short messages (SMSs) 105-7, multimedia messages (MMSs) 105-8 and emails 105-9.

Figure 4:
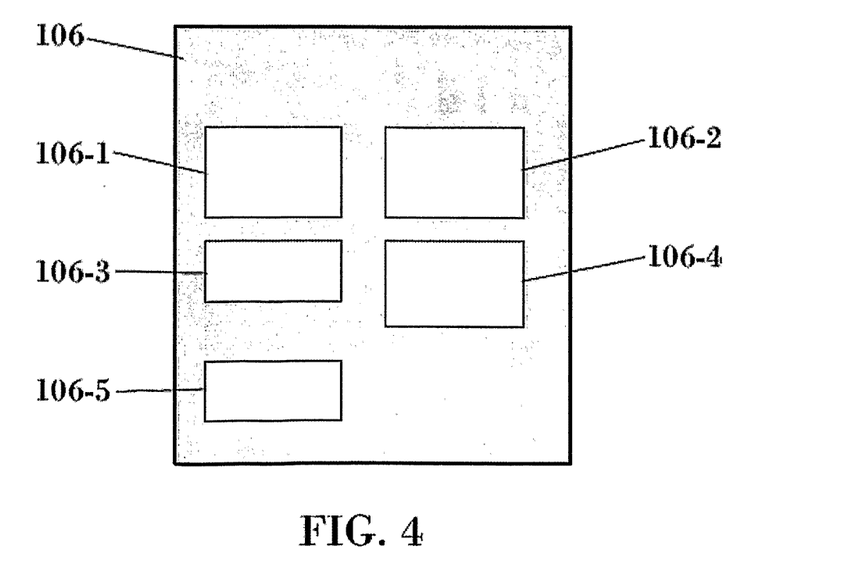
FIG. 4 shows the mobile telephone state information.

The diagram of FIG. 4 shows the mobile terminal state information 106, comprising, among others, the incoming calls log 106-1, the outgoing calls log 106-2, the mobile terminal battery level indicator 106-3, the mobile terminal coverage level indicator 106-4 and the mobile terminal state 106-5. This information is also stored in the mobile terminal 1 and/or in its SIM card. Examples of the mobile terminal state 106-5 are: normal, high, silent, vibration only, etc.

Figure 5:
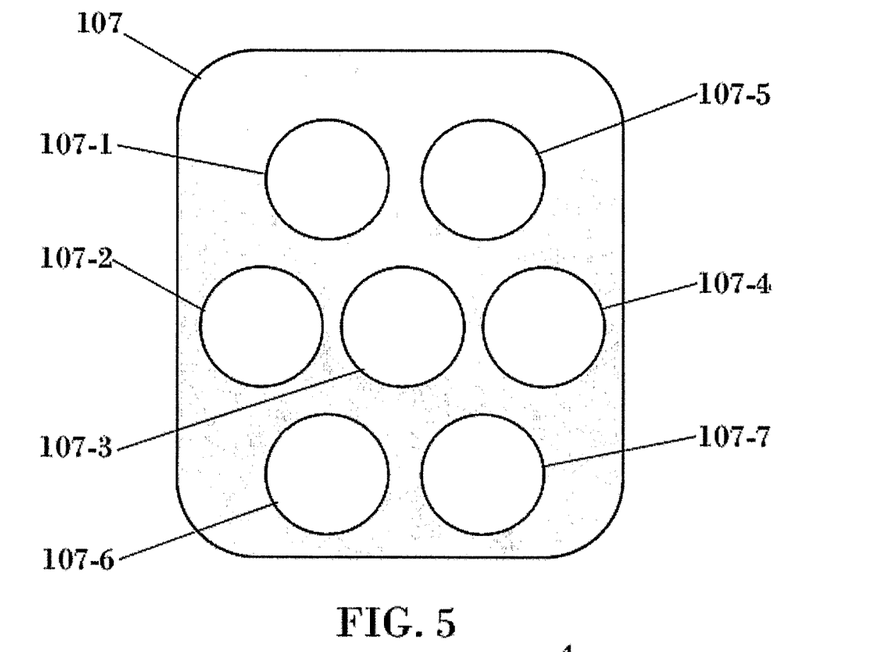
FIG. 5 shows the services which the mobile telephone can offer according to an embodiment of the present invention.

FIG. 5 shows the set of the configured mobile terminal services 107. This set of services is formed by services initiated by the mobile terminal 1. Other services which are initiated by external elements or elements that do not belong to the mobile terminal 1 and which imply executing events, such as incoming calls and receiving SMSs, MMSs or emails, are not inside this set of services. The services which a mobile terminal 1 can offer include, among others: making calls 107-1, sending SMSs 107-2, sending MMSs 107-3, sending emails 107-4, incoming call diversion 107-5, taking photographs 107-6 and recording videos 107-7 with the camera of the mobile terminal 1.

As shown in FIG. 1, the system also comprises a gateway 4. As has been stated previously, this gateway 4 acts as a permanent data connections manager 4. The permanent data connections manager 4 maintains a data connection 200 (as shown in FIG. 2) with one or a plurality of mobile terminals 1 through the mobile network 3 and receives incoming HTTP requests through a data network or internet 5 and resends them to the appropriate mobile terminal 1.

Figure 6:
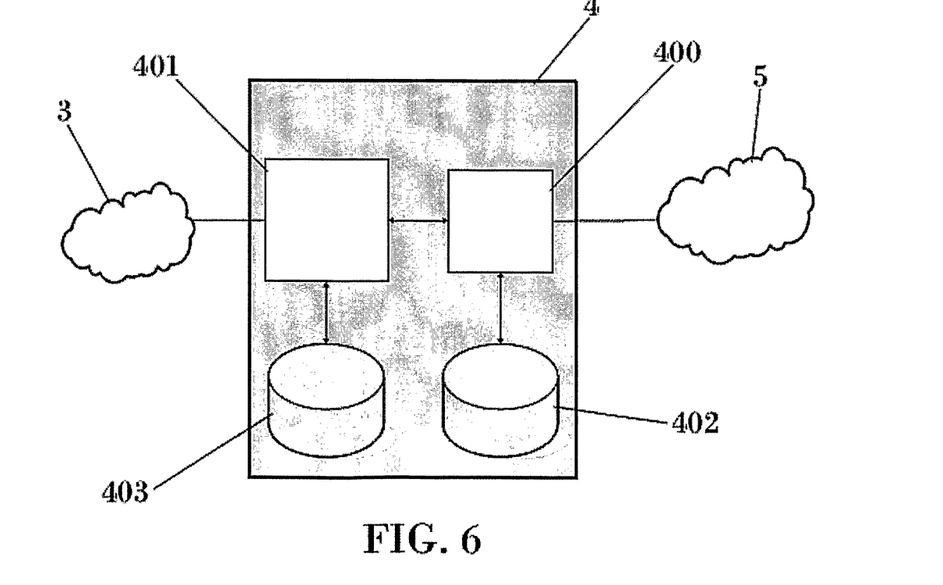
FIG. 6 shows the architecture of the permanent data connections manager or gateway according to an embodiment of the present invention.

As can be seen in FIG. 6, this permanent data connections manager or gateway 4 comprises an incoming HTTP connections manager 400 for receiving the connections of other elements of the data network 5, a connection maintenance manager 401 with the mobile terminals 1 for maintaining the data connections with the mobile terminals 1 and sending them the incoming HTTP requests received by the incoming HTTP connections manager 400. Both managers 400, 401 are also in charge of resending the HTTP responses from the web server 104 of the mobile terminals 1 to the initial element which made the HTTP request. The permanent data connections manager 4 further comprises two databases: a first database 403, called "mobile terminals sessions", for saving the information of the mobile terminals having active data connections with the connections manager 4 and a second database 402, called "incoming connections sessions", storing the information of the active sessions which are pending a response.

Figure 7:
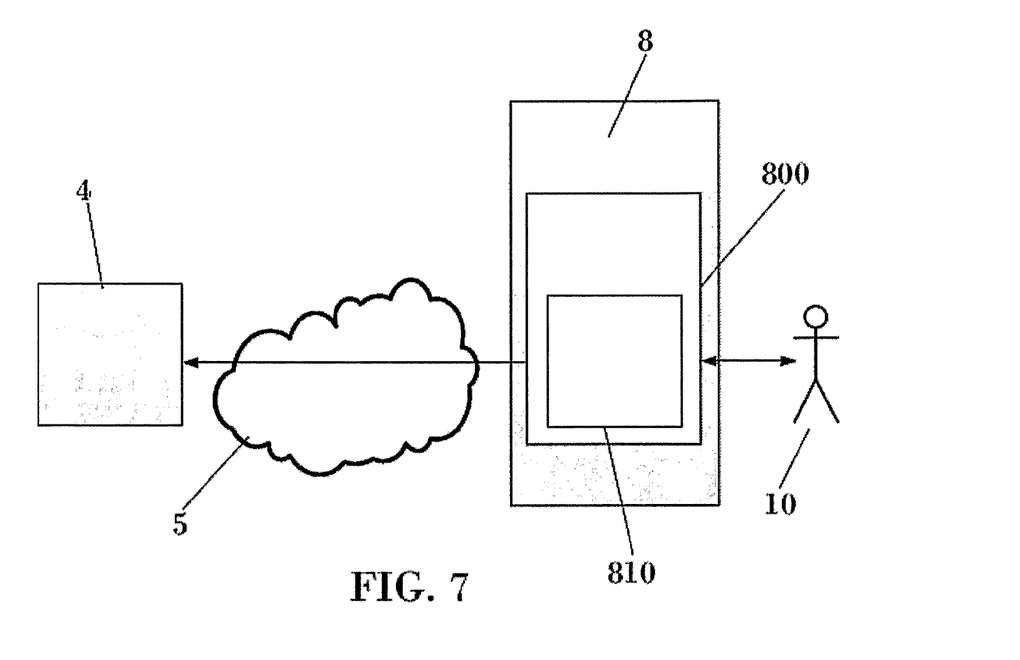
FIG. 7 shows the structure of a remote terminal connected to a data network, through which it can connect to a permanent data connections manager or gateway according to the present invention.

Finally, FIG. 1 also shows a remote terminal 8. This remote terminal 8, which is also shown in FIG. 7, comprises a web browser 800. This web browser 800 is configured to show Internet web pages. The web browser 800 further comprises a web browser extension 810, called a telephone entity, in the web browser, adding the functionality of the mobile terminal 1 to the web browser 800 of this remote terminal 8. This added functionality of the mobile terminal 1 comprises obtaining, adding or deleting the personal data 105 of the user stored in the mobile terminal 1 and its SIM card, and terminal state information 106 and also remotely executing the services 107 of the mobile terminal 1. The telephone entity in the web browser 810 can be, for example but in a non-limiting manner, an additional element in the menu of the browser 800, an additional search bar of the browser 800, an additional button in the tool bar. This extension or telephone entity in the web browser 810 is in charge of making the direct HTTP requests to the web server 104 of the mobile terminal 1 through the permanent data connections manager or gateway 4. This extension 810 can interact with the web pages in which the web browser 800 is browsing and use the information contained in these web pages to add it in the mobile terminal 1 or for remotely executing mobile terminal 1 services. This extension can interact in the opposite manner with the web pages in which the web browser 800 is browsing, i.e., obtaining information from the mobile terminal 1 and using it in the web page.

Figure 9:
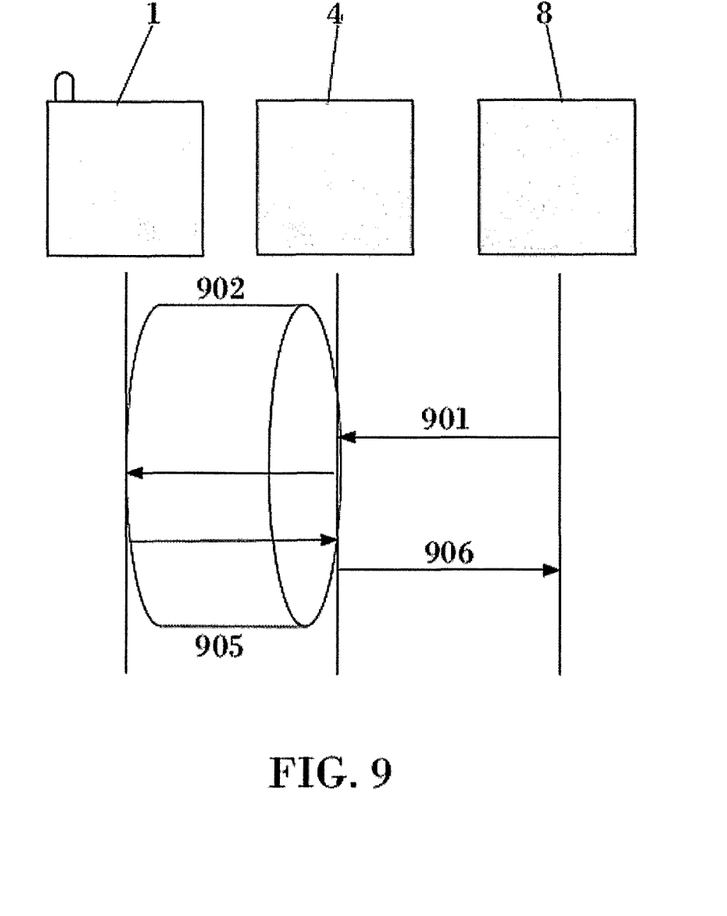
FIG. 9 shows the signal flow for the remote execution of a REST API according to an embodiment of the present invention.

The method provided by the present invention for managing information stored and/or services configured in the mobile terminal 1 from a remote terminal 8 is carried out on the architecture shown in FIG. 1 and is schematized in FIG. 9.

As shown in FIG. 9, a request 901 for executing the REST API of the mobile terminal 1 between the remote terminal 8 and the permanent data connections manager or gateway 4 through the data network 5 is first set up for the purpose of accessing the information and/or mobile terminal 1 services from the remote terminal 8. This request 901 consists of remotely executing the REST API of the mobile terminal 1 in order to access the remote management of the personal data and terminal state information and the remote execution of the terminal services. This access to the remote management and execution is in the form of HTTP requests according to the specific REST API of each resource and service (105-1, 105-2, etc, and 107-1, 107-2, etc).

In other words the process is the following:

The user of the remote terminal 8 opens, through the web browser 800, the extension or telephone entity 810. Upon opening this extension 810 the menu of the mobile terminal 1 is displayed. It is not necessary to make any call to the REST APIs of the mobile terminal 1 for this purpose since the menu of the mobile terminal 1 is embedded in the extension 810.

The user is then identified preferably by means of a user name and a password, according to the basic authentication of the web server 104 of the mobile terminal 1.

The user 10 then chooses the specific information (105-1, 105-2, . . . , 106-1, 106-2 . . . ) to be remotely managed or the service (107-1, 107-2, . . . ) to be remotely executed by clicking on the menu of the extension 810.

The extension or telephone entity 810 thus makes HTTP requests in accordance with the specific REST API of the resource (105-1, 105-2, . . . , 106-1, 106-2 . . . ) or service (107-1, 107-2, . . . ) for remotely managing or executing such information or service.

Once the specific piece of personal data, specific information on the specific terminal or service is downloaded in the remote terminal 8, the user can manage the specific personal data (105-1, 105-2, . . . ) of the user, the specific terminal state information (106-1, 106-2, . . . ) or remotely execute the specific service (107-1, 107-2, . . . ) by means of accessing an interface comprised in the extension 810. This interface can be, for example, a window or a menu of the extension 810.

Therefore if the user 10 clicks on the action "DELETE" in the specific personal data "AGENDA" for example, the HTTP request for deleting a certain element from the agenda of the terminal 1 in accordance with the REST API defined by the web server 104 is sent from the extension 810 to the permanent data connections manager or gateway 4 through the data network 5. To that end the extension 810 shows the state of said action.

Finally, this last piece of state information of said action is downloaded in the terminal 8.

Returning to FIG. 9, once the permanent data connections manager or gateway 4 receives this HTTP request 901 in accordance with the REST APIs, the gateway 4, which has previously set up a permanent connection 200 with the mobile terminal 1 (see FIG. 2), resends 902 the HTTP request to the mobile terminal 1 through the IP connections manager 111 thereof. After a message exchange, which is described in detail in relation to FIG. 10, the IP connections manager 111 of the mobile terminal 1 sends an HTTP response 905 to the permanent data connections manager or gateway 4 comprising the required information. If everything has gone correctly, this HTTP response 905 comprises an "OK" with certain information, depending on each specific method (for example, an XML list of the contacts of the mobile terminal 1 and SIM card, an image, etc.) If there has been an error, an error response is returned. The connections manager or gateway 4 in turn sends the HTTP response 906 to the extension or telephone entity 810 of the web browser 800 of the remote terminal 8, showing the information relating to the REST APIs in the remote terminal 8.

Figure 10:
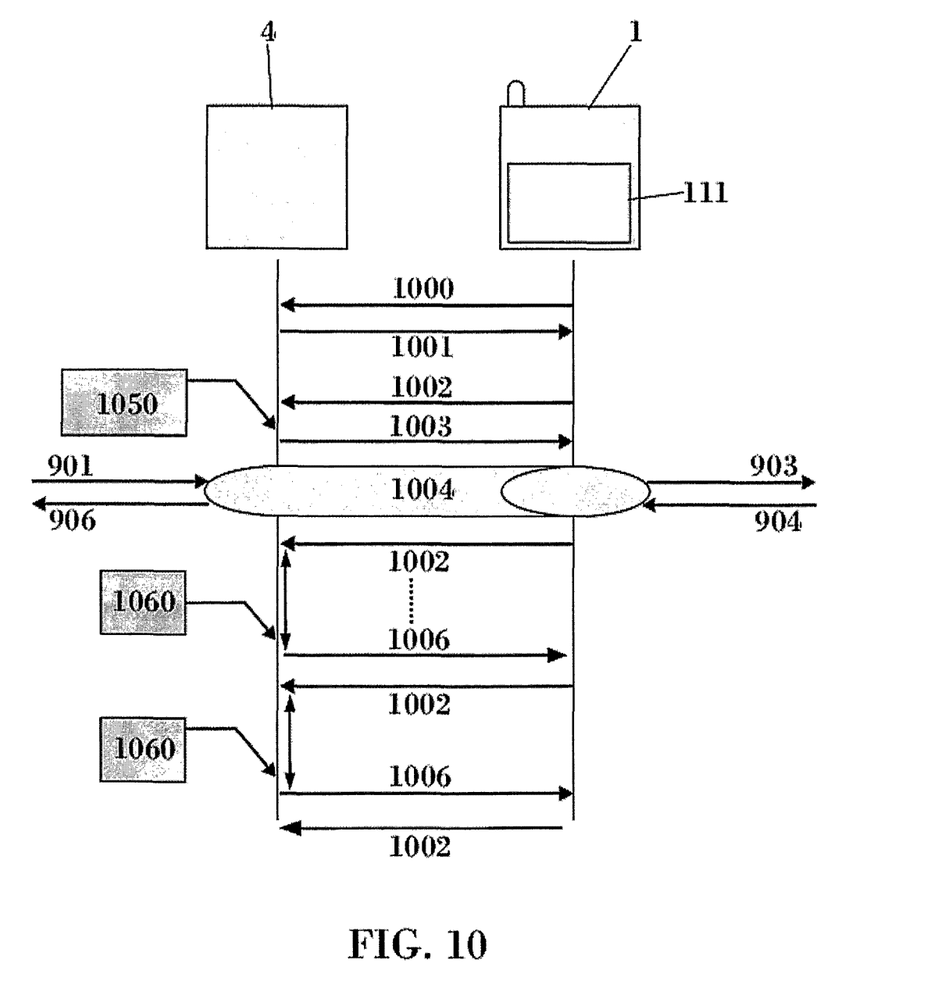
FIG. 10 shows the set-up of a permanent connection between a mobile terminal and the permanent data connections manager or gateway according to an embodiment of the present invention.

FIG. 10 shows the set-up and maintenance of the permanent data connection 200 between the connections manager or gateway 4 and the mobile terminal 1:

Prior to sending the HTTP requests of FIG. 9, the IP connections manager 111 initiates a data connection with the permanent data connections manager 4. This data connection comprises setting up a signaling TCP socket between the mobile terminal 1 and the permanent data connections manager or gateway 4 and a TCP data socket 1004 between the mobile terminal 1 and the permanent data connections manager or gateway 4.

Firstly, the IP connections manager 111 of the mobile terminal 1 sets up a signaling TCP socket between the mobile telephone 1 and the permanent data connections manager or gateway 4 and sends a "CONNECT" message 1000 through such signaling TCP socket. This message 1000 comprises the mobile terminal number or MSISDN and a timeout. The permanent data connections manager 4 responds with a "CONNREGISTERED ok" message 1001 via the signaling TCP socket and stores this connection information in its mobile terminal sessions database 403. The IP connections manager 111 of the mobile terminal 1 then sends a "WAITING" message 1002 to the permanent data connections manager 4 via the signaling TCP socket.

If the permanent data connections manager or gateway 4 receives an HTTP request 901 (from the web server 6) for the mobile terminal 1, the permanent data connections manager or gateway 4 sends it a "REQUESTPENDING" message 1003 via the signaling TCP socket with a Request Id, which is the information necessary in order to set up a data TCP socket for sending this HTTP request. Block 1050 of FIG. 10 shows said HTTP request. Upon receiving this message 1003, the IP connections manager 111 of the mobile terminal and the permanent data connections manager or gateway 4 set up a data TCP socket 1004 and the HTTP request 902 is sent. The HTTP response 905 of the mobile terminal 1 is also sent on this data TCP socket 1004. The IP connections manager 111 of the mobile terminal 1 resends 903 the HTTP request 902 to the web server 104 of the mobile terminal 1 so that the latter processes it and returns an HTTP response 904. The IP connections manager 111 of the mobile terminal 1 resends 905 the HTTP response 904 to the permanent data connections manager or gateway 4 so that the latter resends 906 the HTTP response 905 to the web server 6. When finished sending the HTTP response 906, the data TCP socket 1004 which had been previously created is destroyed.

If in contrast the permanent data connections manager or gateway 4 does not receive an HTTP request 901 intended for the mobile terminal 1, the latter sends a "KEEPALIVE" message 1006 via the signaling TCP socket to the IP connections manager 111 of the mobile terminal 1 when the timeout time interval which had been defined in the initial message 1000 has ended. Blocks 1060 of FIG. 10 show the end of said timeout time intervals. The IP connections manager 111 of the mobile terminal 1 sends another "WAITING" message 1002 via the signaling TCP socket upon receiving this "KEEPALIVE" message 1006 in order to reinitiate the timer to the set time or timeout.

As shown in FIG. 6, the permanent data connections manager or gateway 4 receives the incoming HTTP requests 901 by the incoming HTTP connections manager module or program 400, saves the information relating to the session of that HTTP request 400 in the incoming connections session database 402 and resends the HTTP request to the connection maintenance manager module or program with the mobile terminals 401, which first identifies the destination mobile terminal of the HTTP request. To that end, the destination URL of the HTTP request 901, contains the mobile terminal number or MSISDN of the destination mobile terminal 1 in order to be able to identify it. Examples of a destination URL can be, by way of an illustrative and by no means limiting example, http://34610515151.vodafone.com or http://www.vodafone.com/34610515151. Once the mobile terminal 1 is identified, its location is searched for in the mobile terminal session database 403 and the HTTP request 902 is resent to the appropriate mobile terminal 1 by means of previously explained message exchange.

The method for internally processing the HTTP requests 903 to the REST APIs in the mobile terminal 1 is described below:

The REST APIs are based on unequivocally identifying the actions (obtaining, adding, deleting and executing) together with the resources, information, data or services (personal data 105 of the user, terminal state information 106 and mobile terminal services 107) with URLs which can be called by means of HTTP requests 903 in the web server 104 of the mobile terminal 1. For example, an image 105-7 (piece of data) stored in the mobile terminal 1 can thus be obtained (action) by making an HTTP request 902 903 to a URL which unequivocally identifies that image (piece of data).

The web server 104 of the mobile terminal 1 receives HTTP requests 903. At the time in which the web server 104 receives the HTTP request 903, the corresponding REST API is executed, i.e. what information is to be accessed and what action is to be made or what is to be carried out is identified. A result in the form of an HTTP response is then returned. In other words, if the HTTP request 903, including the destination URL, corresponds to the execution of the REST API, the HTTP request 903 passes to the appropriate manager module or program 101, 102, 103, depending on the destination URL of the HTTP request 903. These manager modules or programs are for managing the personal data of the user 101, for managing terminal state information 102 and for managing the mobile terminal services 103.

The mobile terminal 1 optionally comprises a notifier 108. In this case, the HTTP request 903 is transferred to the notification system 108 of the mobile terminal 1. Thus, if the web server 104 has the authentication, confidentiality and integrity options enabled in the communications for executing the REST API, by means of a conventional authentication and security application, such as an SSL application, the notification system 108 identifies which resource will be executed and who (i.e. which user 10 controls the remote terminal 8) makes this request. The identity of who is making the HTTP request 903 gives the identity defined in the basic authentication system of the web server 104, preferably the authentication system defined in RFC 2617. Once identified, an access list database 109 is consulted in order to check if said user has permissions for executing the resource identified by the URL and HTTP request 903. If the user is still not registered in the database 109 or does not have permanent permissions or always denied permissions, the user is notified of who is to execute which resource in the mobile terminal 1. This notification is preferably carried out by means of a window which is displayed on the screen of the mobile terminal 1. The user 10 who is accessing from a remote terminal 8 is not necessarily the same user who is handling the mobile terminal 1. If the remote user 10 has permanent permissions, the corresponding execution is not prevented even though there is no one at the end of the mobile terminal 1, since the notification window does not appear and the system operates without problems. If no one is handling the mobile terminal 1 and the notification window appears (which means that the person who is accessing does not have permanent permissions and therefore needs permission), the HTTP request is not provided and therefore the REST APIs are not executed.

Thus, given a remote user 10 who is making a request relating to a certain piece of information or service R (the information or service of the REST API to be executed), the notification system 108 provides several options: 1) always allowing the user 10 to execute that information or service; 2) allowing the user 10 to execute the information or service R only once; 3) allowing the user 10 to execute the information or service R during a certain time period; 4) not allowing the user 10 to execute the information or service R this specific time; and 5) never allowing the user 10 to execute the information or service R. If the user 9 of the mobile terminal 1 gives permission to the user 10, the HTTP request 903 is transferred to the specific manager module or program 101, 102, 103 of the information or service to be executed. If in contrast the notification system 108 sees that the user does not have permission for carrying out that information or service, the notifier 108 returns the HTTP request 903 to the web server 104, indicating it to respond to the user with an HTTP error response 904 or denied access response 403.

Figure 8:
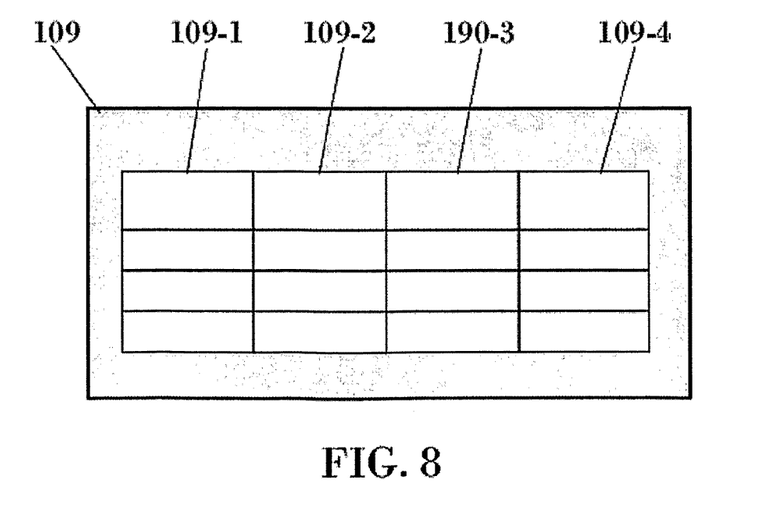
FIG. 8 shows the structure of the access lists included in the mobile terminal according to the present invention.

As previously stated, the information relating to which users have permission to different information or services is stored in the access list database 109 of the mobile terminal 1. FIG. 8 shows the structure of the access lists 109 included in the mobile terminal 1: column 109-1 includes users; column 109-2 includes information or types of personal data of the user stored in the mobile terminal or its SIM, mobile terminal state information or mobile terminal services; column 109-3 includes the type of access, i.e., unlimited access, temporary access, one-time access, once-denied or permanently denied access, which each user has to each piece of information or service; and column 109-4 includes the time or number of times allowed for each user and information and service.

As previously mentioned, the notification system 108 is optional and executing it requires the basic authentication to be enabled in the web server 104.

The manager modules or programs for managing personal data of the user 101, for managing the terminal state information 102 and for managing the mobile terminal services 103 receive the request from the web server 104 or optionally if the notifier 108 is enabled, from the notifier 108. These programs or modules 101, 102, 103 identify the specific resource and the action which is to be carried out with it. It thus relates to the program or module for managing personal data of the user 101, the information is that shown in FIG. 3 and the action is one of the following: obtaining a data list, obtaining a piece of data, adding a piece of data or deleting a piece of data. If it relates to the program or module for managing the terminal state information 102, the information is that shown in FIG. 4 and the action is one of the following: obtaining a piece of data (for all data of FIG. 4) and, for the incoming call log 106-1 and the outgoing call log 106-2, also deleting a piece of data. If it relates to the program or module for managing the mobile terminal services 103, the services are those shown in FIG. 5 and the action is executing the service in the mobile terminal 1. These programs or modules 101, 102, 103 access their respective personal data resources of the user 105 in the case of the program or module for managing personal data of the user 101, the terminal state information 106 in the case of the program or module for managing the terminal state information 102 and mobile terminal services 107 in the case of the program or module for managing the mobile terminal services 103. There are many REST APIs defined as information and services defined in the personal data resources of the user 105, the terminal state information 106 and the mobile terminal services 107. In other words there is a REST API for the contacts 105-1, another one for the calendar 105-2, another one for sounds 105-3, etc., another one for the incoming call log 106-1, another one for the outgoing call log 106-2, etc., another one for making calls 107-1, another one for sending SMSs 107-2, etc, until completing all services and resources. Finally, these programs or modules 101, 102, 103 are in charge of creating the response to the initial request of the REST APIs and of providing it with the suitable HTTP response form for passing it to the web server 104, so that the latter returns to it the HTTP response 904 to the initial request which it received from the IP connections manager 111.

After the message exchange carried out on the connections set up and shown with reference to FIGS. 9 and 10, an information or services management interface of the mobile terminal 1 is displayed in the remote terminal 8.

The extension 810 shows and allows adding and deleting information relating to the personal data of the user, i.e., the contacts, notes, calendar, images, sounds, videos, SMSs, MMSs and emails stored in the mobile terminal 1 and its SIM card and contain information relating to the telephone state, i.e., the incoming calls log, outgoing calls log, battery indicator, mobile telephone state and coverage indicator. Information relating to the incoming and outgoing calls log can additionally be deleted from the extension 810. Finally, the extension 810 shows and allows executing mobile terminal services from it, such as making calls, incoming call diversion, sending an SMS, sending an MMS, sending emails, taking photographs and recording videos. In summary, from the terminal 8, a user 10 can remotely manage the mobile terminal 1 from the extension 810.

In short, the method of interaction of the user in the extension or telephone entity 810 of a web browser 800 of a remote terminal 8 is the following:

The web browser 800 has an extension 810 which is a telephone entity 810. It can:

Obtain, add and delete information relating to the personal data of the user, i.e., contacts, notes, calendar, images, sounds, videos, SMSs, MMSs and emails stored in the mobile terminal and SIM card;

Obtain information relating to the terminal state, i.e., the incoming call log, outgoing call log, battery indicator, mobile terminal state and coverage indicator;

Delete the incoming call log, outgoing call log;

Execute mobile terminal services, such as making calls, incoming call diversion, sending an SMS, sending an MMS, sending and-mails, taking photographs and recording videos.

The extension or telephone entity in the web browser 810 can be, in a non-limiting manner, an additional element in the menu of the browser, an additional search bar of the browser, an additional button in the tool bar, etc. This entity 810 is that which, making the HTTP requests to the appropriate mobile terminal 1 according to that which has been previously explained, enables the previously described functionality.

The user 10 can thus be browsing through any internet web page and:
- use the information contained in the page to save it in the mobile terminal 1 by means of the functionality of adding personal data, such as for example saving an image of a web page in the images part of the mobile terminal;
- use the information contained in the page to execute a mobile terminal 1 service, such as for example use a telephone number for writing a short message (SMS) from the browser 800;
- use the information obtained from the mobile terminal, both the personal data and that of the mobile terminal state, to introduce it into a web page.

In view of this description and set of drawings, a person skilled in the art could understand that the invention has been described according to several preferred embodiments thereof, but multiple variations can be introduced in said preferred embodiments, without departing from the object of the invention as it has been claimed.

The invention claimed is:

1. A method for managing information stored and/or services configured in a mobile terminal from a remote terminal, wherein said mobile terminal is configured to connect to a mobile communications network and comprises a web server having a plurality of Application Programming Interfaces (APIs) with an API of the plurality of APIs defined for each piece of information and for each service provided by the mobile terminal, and wherein said remote terminal comprises a web browser and has access to a data network, the web browser of the remote terminal having a web browser extension, the method comprising:
   making, from the web browser extension of the remote terminal, a HyperText Transfer Protocol (HTTP) request for managing at least one piece of information stored or one service configured in the mobile terminal, wherein said HTTP request is in accordance with said at least one API of the plurality of APIs defined in the web server of said mobile terminal, and wherein said HTTP request comprises an identifier of said information or service to be managed; and
   sending, from the mobile terminal to said web browser extension of the remote terminal, an HTTP response in accordance with said at least one API of the plurality of APIs defined in the web server of the mobile terminal and showing in said remote terminal an interface comprised in said web browser extension for managing said information stored or service configured in the mobile terminal,
   wherein the web browser extension of the remote terminal comprises two or more of:
   an element in the menu of the web browser of the remote terminal;
   a search bar of the web browser of the remote terminal; and
   a button in the tool bar of the web browser of the remote terminal, and
   wherein the web browser extension of the remote terminal is configured to transfer to the mobile terminal information contained in conventional web pages of the web browser or to use the information to execute services of the mobile terminal.

2. The method according to claim 1, wherein the HTTP request from said web browser extension to the mobile terminal comprises the steps of:
   making an HTTP request through said data network from the web browser extension to a gateway capable of locating the mobile terminal which is connected to a mobile communications network; and
   sending said HTTP request to an IP connections manager of the mobile terminal.

3. The method according to claim 2, wherein said HTTP request in accordance with said at least one API of the plurality of APIs defined in the web server of the mobile terminal sent to the IP connections manager of the mobile terminal is sent to the web server by means of said HTTP request.

4. The method according to claim 3, wherein said HTTP request in accordance with said at least one API of the plurality of APIs defined in the web server sent to the web server of the mobile terminal is in turn sent to a manager module which is chosen from: a module for managing personal data of the user, a module for managing the mobile terminal state information and a module for managing the mobile terminal services.

5. The method according to claim 3, further comprising a notification step for notifying the user whereby the user is offered one of the following options: permanently allowing the execution of the API of the plurality of APIs, temporarily allowing said execution, permanently denying said execution or temporarily denying said execution.

6. The method according to claim 2, wherein said HTTP request is made on a data channel which is set up in a signaling channel previously set up between the gateway and the IP connections manager of the mobile terminal.

7. The method according to claim 6, wherein said signaling channel is a TCP socket.

8. The method according to claim 6, wherein said data channel is a TCP socket.

9. The method according to claim 1, wherein the HTTP response from the mobile terminal to the web browser extension comprises the steps of:
   sending an HTTP response in accordance with said at least one API of the plurality of APIs defined in the web server of the mobile terminal from an IP connections manager of the mobile terminal to a gateway through the mobile communications network; and
   sending said HTTP response in accordance with said at least one API of the plurality of APIs defined in the web server of the mobile terminal from said gateway to the web browser extension through the data network.

10. The method according to claim 9, wherein said HTTP response is carried out on a data channel which is set up in a signaling channel previously set up between the gateway and the IP connections manager of the mobile terminal.

11. The method according to claim 1, wherein said identifier of the information or service to be managed comprised in the HTTP request comprises the URL of the information or service which is to be managed.

12. The method according to claim 11, wherein said URL comprises the MSISDN of the mobile terminal.

13. The method according to claim 1, wherein said information stored in the mobile terminal relates to a piece of information which is chosen from one of the following groups: personal data of the user and mobile terminal state information.

14. The method according to claim 13, wherein with said information an action is carried out which is chosen from one of the following groups of actions: actions relating to managing personal data of the user and actions relating to managing the mobile terminal state information.

15. The method according to claim 1, wherein said information stored in the mobile terminal is stored in the memory of the mobile terminal or in a SIM card thereof.

16. The method according to claim 1, wherein said service configured in the mobile terminal relates to a service from the group of mobile terminal services.

17. The method according to claim 16, wherein with said service an action is carried out which is chosen from the group of actions relating to managing the mobile terminal services.

18. A system comprising:
a mobile terminal configured to be connected to a mobile communications network, wherein said mobile terminal comprises a web server having a plurality of Application Programming Interfaces (APIs) with an API of the plurality of APIs defined for each piece of information and for each service provided by the mobile terminal; and
a terminal configured to be connected to a data network, wherein said terminal comprises a web browser which in turn comprises a web browser extension;
wherein the terminal is further configured to:
make, from the web browser extension, a HyperText Transfer Protocol (HTTP) request for managing at least one piece of information stored or one service configured in the mobile terminal, wherein said HTTP request is in accordance with said at least one API of the plurality of APIs defined in the web service of said mobile terminal, and wherein said HTTP request comprises an identifier of said information or service to be managed;
receive, from the mobile terminal, an HTTP response in accordance with said at least one API of the plurality of APIs defined in the web server of the mobile terminal, and
show, in said web browser extension, an interface form managing said information stored or service configured in the mobile terminal;
wherein the web browser extension comprises two or more of:
an element in the menu of the web browser;
a search bar of the web browser; and
a button in the tool bar of the web browser, and
wherein the web browser extension of the terminal is configured to transfer to the mobile terminal information contained in conventional web pages of the web browser or to use the information to execute services of the mobile terminal.

19. The system according to claim 18, further comprising a gateway capable of setting up a connection between the data network and the mobile communications network.

20. A method for managing information stored and/or services configured in a mobile terminal from a remote terminal, wherein said mobile terminal is configured to connect to a mobile communications network and comprises a web server having a plurality of Application Programming Interfaces (APIs) with an API of the plurality of APIs defined for each piece of information and for each service provided by the mobile terminal, and wherein said remote terminal comprises a web browser and has access to a data network, the web browser of the remote terminal having a web browser extension, the method comprising:
making, from the web browser extension of the remote terminal, a HyperText Transfer Protocol (HTTP) request for managing at least one piece of information stored or one service configured in the mobile terminal, wherein said HTTP request is in accordance with said at least one API of the plurality of APIs defined in the web server of said mobile terminal, and wherein said HTTP request comprises an identifier of said information or service to be managed; and
sending, from the mobile terminal to said web browser extension of the remote terminal, an HTTP response in accordance with said at least one API of the plurality of APIs defined in the web server of the mobile terminal and showing in said remote terminal an interface comprised in said web browser extension for managing said information stored or service configured in the mobile terminal,
wherein the web browser extension of the remote terminal comprises two or more of:
an element in the menu of the web browser of the remote terminal;
a search bar of the web browser of the remote terminal; and
a button in the tool bar of the web browser of the remote terminal, and
wherein the web browser extension of the remote terminal is configured to introduce information obtained from the mobile terminal into a web page of the web browser of the remote terminal.

* * * * *